(12) United States Patent
Lampman et al.

(10) Patent No.: US 10,696,021 B2
(45) Date of Patent: Jun. 30, 2020

(54) ASYMMETRIC GLAZING LAMINATES WITH HIGH IMPACT RESISTANCE

(71) Applicants: DeWitt Lampman, Allison Park, PA (US); Michael Ulizio, Pittsburgh, PA (US)

(72) Inventors: DeWitt Lampman, Allison Park, PA (US); Michael Ulizio, Pittsburgh, PA (US)

(73) Assignee: Pittsburgh Glass Works, LLC, Pittsburgh, PA (US)

(*) Notice: Subject to any disclaimer, the term of this patent is extended or adjusted under 35 U.S.C. 154(b) by 62 days.

(21) Appl. No.: 15/876,518

(22) Filed: Jan. 22, 2018

(65) Prior Publication Data

US 2018/0207911 A1    Jul. 26, 2018

Related U.S. Application Data

(60) Provisional application No. 62/448,657, filed on Jan. 20, 2017.

(51) Int. Cl.

| | |
|---|---|
| *B32B 17/10* | (2006.01) |
| *C03C 17/36* | (2006.01) |
| *B32B 37/10* | (2006.01) |
| *B32B 37/18* | (2006.01) |

(52) U.S. Cl.
CPC .. *B32B 17/10917* (2013.01); *B32B 17/10036* (2013.01); *B32B 17/10559* (2013.01); *B32B 17/10752* (2013.01); *B32B 17/10761* (2013.01); *B32B 17/10779* (2013.01); *B32B 37/10* (2013.01); *B32B 37/182* (2013.01); *C03C 17/3681* (2013.01); *B32B 2605/006* (2013.01)

(58) Field of Classification Search
None
See application file for complete search history.

(56) References Cited

U.S. PATENT DOCUMENTS

| | | | |
|---|---|---|---|
| 2013/0295357 A1* | 11/2013 | Cleary | B32B 17/10036 428/215 |
| 2015/0239215 A1 | 8/2015 | Offerman et al. | |
| 2016/0318284 A1 | 11/2016 | Cleary et al. | |
| 2018/0370194 A1* | 12/2018 | Claireaux | B32B 17/10036 |

OTHER PUBLICATIONS

Leonhard et al., Novel Lightweight Laminate Concept with Ultrathin Chemically Strengthened Glass for Automotive Windshileds, SAE International Journal of Passengar Cars—Mechanical Systems, vol. 8, No. 1, May 2015, abstract.

* cited by examiner

*Primary Examiner* — Robert T Butcher
(74) *Attorney, Agent, or Firm* — Dentons Cohen & Grigsby P.C.

(57) ABSTRACT

An asymmetric glazing laminate (34) that includes an outer transparency (36) and an inner transparency (50) that are maintained together by an interlayer (44). Outer transparency (36) has a nominal thickness (42) of 2.1 mm and inner transparency (50) has a nominal thickness of 1.2 mm. The asymmetric glazing has greater stone impact resistance and lower per unit weight than symmetric glazing laminate (10) in which the outer and inner transparencies (12 and 26) each have nominal thickness of 2.1.

9 Claims, 3 Drawing Sheets

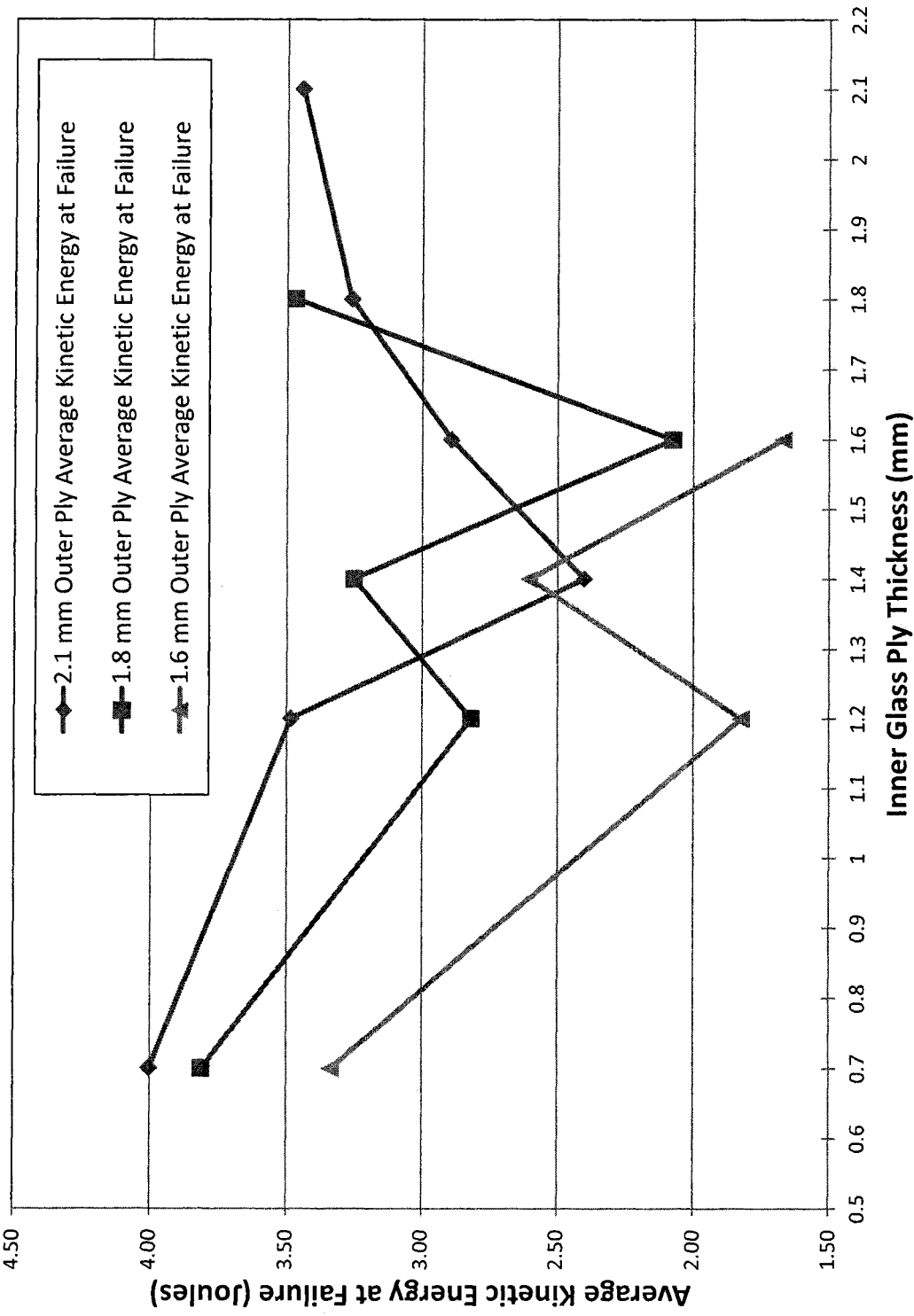

ASYMMETRIC GLAZING LAMINATES WITH HIGH IMPACT RESISTANCE

BACKGROUND OF THE INVENTION

Field of the Invention

The presently disclosed invention is related to window glazings that are suitable for use in automotive applications.

Discussion of the Prior Art

For many years, automotive vehicles have employed window glazings in which two sheets of glass or other transparent material are bonded together in a process with a sheet of light transmissive polymer material. Typically, the glass is float glass. The polymer is generally selected from a group of materials that include polyvinyl butyral and ethylene vinyl acetate.

More recently, there has been an increasing emphasis on improved mileage efficiency for automotive vehicles. The emphasis has been addressed, in part, though reduction of vehicle weight. With respect to automotive glazings, the emphasis has been on weight reduction by decreasing the thickness of the glazing laminate.

In reducing the thickness of glazing laminates, a number of considerations must be addressed. Some of those lead to competing variables in glazing designs. Examples include mechanical rigidity and stability, optical distortion, abrasion resistance, and light transmission as well as others. All of these considerations must be reasonably accommodated to produce a commercially successful automotive glazing.

As automotive glazings become thinner, one consideration that is of particular significance is stone impact resistance. As used herein, stone impact resistance is a measure of the capability of the glazing laminate to withstand the impact of stones and other objects that may be projected against the glazing without causing a fracture in the glazing. Stone impact resistance is especially a hazard when the vehicle is moving at relatively high speed and is particularly significant for windshields and other glazings that are oriented in a forward facing position in the vehicle. Windshield fractures that occur when the vehicle is moving at high speeds are a notable safety risk. The significance of this hazard and the potential benefit for weight reduction is enhanced by the fact that windshields are the largest glazed area in most vehicles.

In the prior art, glass transparencies used in glazing laminates were generally of the same thickness. It has been recognized that one way to decrease the glazing weight while still meeting other performance requirements would be to reduce the thickness of only one of the glass panels or to reduce the thickness of one glass panel more than the other. A glazing laminate in which one of the glass layers is thinner than the other is referred to herein as an "asymmetric glazing." In contrast, a glazing laminate in which the glass layers have the same nominal thickness is referred to herein as a "symmetric glazing."

Experimental results of comparisons between symmetric and asymmetric glazing laminates have been the basis for several general assumptions as to the behavior of glazing laminates with respect to stone impact resistance. For example, "Effect of Windshield Design on High Speed Impact Resistance" X. Sun et al., International Body Engineering Conference, Oct. 3-5, 2000, SAE International (herein "the SAE Conference Paper") reported that damage resulting at the No. 2 surface (i.e. the surface of the outer glass panel that faces the polymer interlayer) is primarily dependent on the thickness of the outer layer. The SAE Conference Paper concluded that the "outer glass layer seems to be critical in determining the magnitude of all the monitored damage parameters." It further concluded that an asymmetric construction in which the outer layer is thicker than the inner layer is more resistant to stone impacts than a glazing laminate with layers of the same thickness or in which the thicker layer was the inner layer. It further concluded that (at least in one comparison) an asymmetric glazing laminate affords a significant weight reduction (about 10%) in comparison to a symmetric glazing wherein the thickness of the symmetric glass panels is the same as the thickness of the outer panel of the asymmetric glazing. The SAE Conference Paper generally concluded that the thickness of the outer glass layer of the glazing laminate dominates the impact resistance of the windshield. It was stated that an optimal design was an asymmetric glazing in which the outer glass layer is 0.5 mm thicker than the inner glass layer resulting in a 10% weight reduction.

More recent investigation of stone impact resistance has led to somewhat different conclusions regarding stone impact resistance of asymmetric glazing laminates. For example, U.S. Pat. No. 9,044,919 (herein "the '919 Patent") discusses asymmetric glazing laminates for automotive use. The '919 Patent discusses stone impact resistance of asymmetric glazings in which the thickness of the outer sheet is 1.6 mm to 1.8 mm and the thickness of the inner sheet is 1.2 mm to 1.4 mm. Stone impact resistance from asymmetric specimens selected from those ranges was compared to a symmetrical glazing in with the thickness of the glass sheets was 2.1 mm. and it was found that stone impact resistance of the asymmetric glazings was greater. Moreover, the '919 Patent states that the stone impact resistance of one asymmetric glazing was still greater than another asymmetric glazing in which both the inner and outer glass sheets were respectively thicker. The '919 Patent summarized these results in terms of the ratio of the thickness of the outer glass sheet to the thickness of both the inner and outer glass sheets as being in the range of 0.552 to 0.571.

Significantly, the report of the '919 Patent that the stone impact resistance of an asymmetric glazing with an 1.8 mm outer transparency and 1.4 mm inner (here "a 1.8/1.4 mm asymmetric glazing") and an asymmetric glazing with a 1.6 mm outer transparency and 1.3 mm inner transparency (herein "a 1.6/1.3 mm asymmetric glazing" seemed to conflict with other reported data such as in the SAE Conference Paper that concluded that the thickness of the outer glass layer of the glazing laminate dominates the impact resistance of the windshield. Moreover, the results of the '919 Patent did not agree with empirical results of stone impact resistance test on asymmetric glazings conducted by others.

SUMMARY OF THE INVENTION

In accordance with the disclosed invention, it was recognized that the generalized conclusions regarding the stone impact resistance of asymmetric glazing laminates as reported in the prior art were subject to significant, previously unrecognized boundary conditions. Further consideration of stone impact resistance supports the finding that the generalized conclusions and assumptions reported with prior art are not valid across broad ranges of inner transparency thicknesses in combination with outer transparency thicknesses. Such conclusions and assumptions are subject to important and significant boundary limitations as to the respective parameters of the outer transparency and the inner transparency—particularly the thickness dimensions of those transparencies such as the 1.8/1.4 mm and the 1.6/1.3 asymmetric glazing discussed in the '919 Patent. Outside of those boundary limitations, there are radical divergences from such conclusions and assumptions that have significant and unexpected effects on the stone impact resistance of asymmetric glazing constructions.

In the presently disclosed embodiment of the invention, an asymmetric glazing includes an outer transparency sheet and an inner transparency sheet that are maintained in a laminate by an interlayer of polymer material that is interposed between the outer and inner transparency sheets. The glazing is asymmetric with the outer transparency sheet having a nominal thickness of 2.1 mm and the inner transparency sheet having a nominal thickness of 1.2 mm.

Preferably, the inner transparency sheet and the outer transparency sheet are made of a glass composition in which thickness tolerances for commercial quantities are plus or minus 0.05 mm.

Also preferably, the stress levels in the outer transparency upon failure due to impact are greater than the stress levels of a symmetric glazing in which the nominal thickness of the inner and outer transparency sheets is 2.1 mm.

Additionally, it is preferred that the unit weight of the asymmetric glazing is 20% lower than a symmetrical glazing of the same unit weight wherein the inner and outer transparency sheets each have a nominal thickness of 2.1 mm.

Other advantages and features of the presently disclosed invention will become apparent to those skilled in the pertinent art as a presently preferred embodiment of the disclosed invention proceeds.

BRIEF DESCRIPTION OF THE DRAWINGS

A presently preferred embodiment of the disclosed invention is shown and described in connection with the accompanying drawings in which:

FIG. 4 is a graph of "inner transparency thickness" vs. "average kinetic energy at failure" for several families of asymmetric glazings, including the family of asymmetric glazings in which the nominal thickness of the outer transparency is 2.1 mm.

DESCRIPTION OF A PRESENTLY PREFERRED EMBODIMENT

Figure 1:
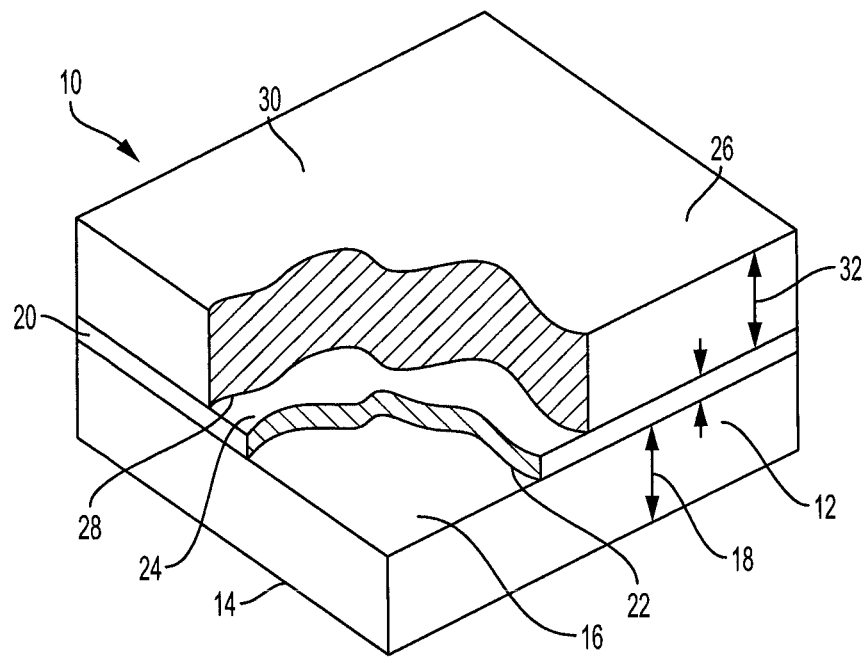
FIG. 1 is a top perspective view of a section of a symmetric glazing with portions thereof broken away to better disclose the structure thereof.

FIG. 1 shows a symmetric glazing 10 of the type used in automotive glazings known in the prior art. Symmetric glazing 10 includes an outer transparency sheet 12 that defines a first surface 14 and a second surface 16 that is oppositely disposed on sheet 12 from first surface 14. First surface 14 and second surface 16 are separated from each other by a thickness dimension 18 that is oriented orthogonally to each of first surface 14 and second surface 16.

Symmetrical glazing 10 further includes an interlayer 20 that defines a layer of polymer material having a first surface 22 and a second surface 24 that is oppositely disposed on said polymer layer from first surface 22. The first surface 22 of interlayer 20 is opposed to the second surface 16 of outer transparency sheet 12.

Symmetric glazing 10 further includes an inner transparency sheet 26 that defines a first surface 28 and a second surface 30 that is oppositely disposed on sheet 26 from first surface 28. First surface 28 and second surface 30 are separated from each other by a thickness dimension 32 that is oriented orthogonally to each of first surface 28 and second surface 30. Symmetrical glazing 10 is "symmetrical" in that thickness 18 of outer transparency sheet 12 is nominally the same as thickness 32 of inner transparency sheet 26

Figure 2:
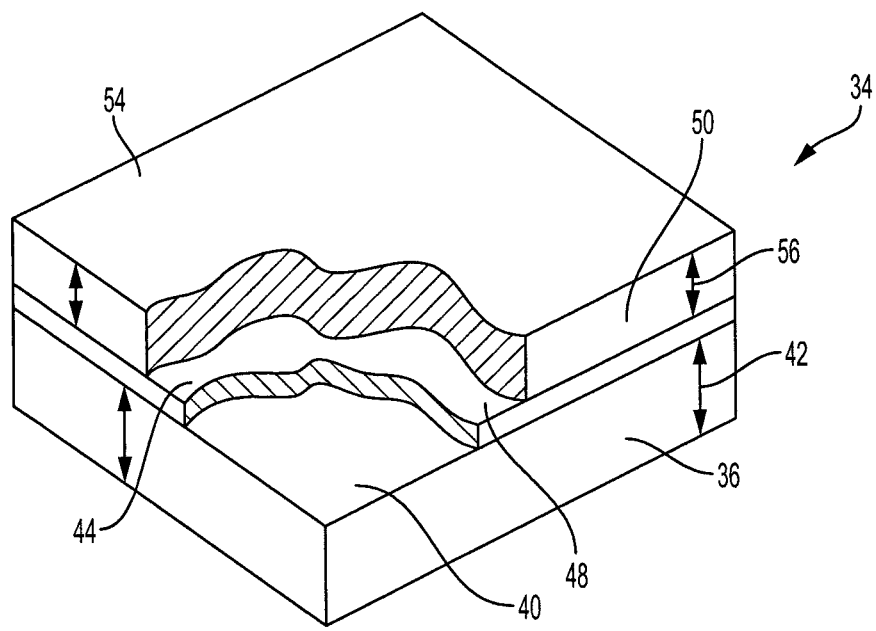
FIG. 2 is a top perspective view of a section of an embodiment of the asymmetric glazing disclosed herein with portions thereof broken away to better disclose the structure thereof.
Figure 3:
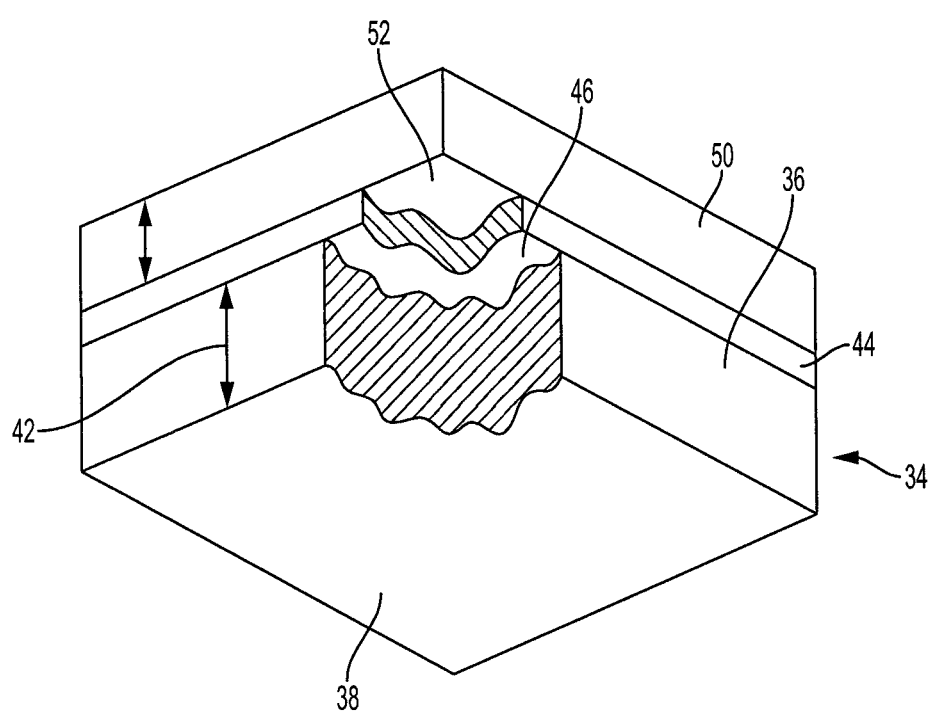
FIG. 3 is a bottom perspective view of the section of the asymmetric glazing shown in FIG. 2 with portions thereof broken away to better disclose the structure thereof.

FIGS. 2 and 3 show top and bottom perspective views of a presently preferred embodiment of an asymmetric glazing laminate 34 according to the presently disclosed invention. Much of the structure of asymmetric glazing laminate 34 is similar to the structure of symmetric glazing laminate 10, but there are important differences that result in surprising and unexpected differences in performance of asymmetric glazing laminate 34.

As shown in FIGS. 2 and 3, asymmetric glazing 34 includes an outer transparency sheet 36 that defines a first surface 38 and a second surface 40 that is oppositely disposed on sheet 36 from first surface 38. First surface 38 and second surface 40 are separated from each other by a thickness dimension 42 that is oriented orthogonally to each of first surface 38 and second surface 40.

Asymmetric glazing 34 further includes an interlayer 44 that defines a layer of polymer material having a first surface 46 and a second surface 48 that is oppositely disposed on said polymer layer from first surface 46. First surface 46 of interlayer 44 is opposed to the second surface of 40 of outer transparency sheet 36.

Asymmetric glazing 34 further includes an inner transparency sheet 50 that defines a first surface 52 and a second surface 54 that is oppositely disposed on sheet 50 from first surface 52. First surface 52 and second surface 54 are separated from each other by a thickness dimension 56 that is oriented orthogonally to each of first surface 52 and second surface 54. Asymmetric glazing 34 is "asymmetric" in that thickness 42 of outer transparency 36 is greater than the thickness 56 of inner transparency sheet 50.

In asymmetric glazing 34, interlayer 44 may be a polymer material such as ethylene vinyl acetate, polyvinyl butyral, polyethane, polycarbonate, polyethylene terephthalates, and combinations thereof. Interlayer 44 bonds outer transparency sheet 36 with inner transparency sheet 50 in accordance with autoclave processes that are known in the art. Following the autoclave process, the thickness of interlayer 44 may be in the range of 0.71 mm to 0.81 mm.

In comparison to asymmetric glazings generally known in the prior art, asymmetric glazing 34 has an extreme degree of asymmetry—that is the thickness of inner transparency 50 is not merely less than the thickness of outer transparency 36; it is much less. The relative thickness of outer transparency sheet 36 and the thickness of inner transparency sheet can be expressed in various comparison ratios. However, it has been found that such comparison ratios are not a reliable predictor of stone impact resistance (and certain other performance characteristics of asymmetric glazing laminates) when applied over broad ranges of thickness dimensions. It has been found that such ratios are subject to range boundaries for the glazing dimensions and that when those dimensions are exceeded very different and unpredicted performance characteristics may occur. In the case of the presently disclosed invention, FIG. 4 shows such surprising and unexpected results for stone impact resistance of asymmetric glazings when compared to anticipated results according to prior art teachings.

FIG. 4 is a graph of stone impact resistance vs. thickness of inner transparency sheets for three families of asymmetric glazings in which the thickness of the outer transparency sheet is constant in each family. In the three families of asymmetric glazings in FIG. 4, the thickness of the outer transparency sheet is 1.6 mm, 1.8 mm, and 2.1 mm for the respective families. FIG. 4 displays stone impact resistance in terms of "average kinetic energy at failure" for asymmetric glazings that were tested according to a protocol that is further described in "Practical Design Considerations for Lightweight Windshield Applications" published Mar. 28, 2017, which document is hereby specifically incorporated herein by reference in its entirety. Stone impact resistance is expressed in terms of "energy required before failure" of the asymmetric glazing. Thus, higher energy equates to greater stone impact resistance.

FIG. 4 shows a general correlation in stone impact resistance between asymmetric glazings in which the thickness 42 of outer transparency sheet 36 is held constant at 1.6 mm and 1.8 mm while inner transparency sheet 50 is varied from a minimum of 0.7 mm to the point where thickness 56 of inner transparency sheet 50 equals the thickness of outer transparency sheet 36. At that point, the glazing is no longer an asymmetric glazing and becomes a symmetric glazing (1.6/1.6 mm for the 1.6 mm family and 1.8/1.8 mm for the 1.8 mm family). For the 1.6 mm and 1.8 mm families, the stone impact resistance is greater for the thicker 1.8 mm glazing than the 1.6 mm glazing for all thicknesses of the inner transparency sheet 50. That is consistent with statements in the SAE Conference Paper discussed previously herein to the effect that damage to the glazing due to stone impacts is "primarily dependent on the outer layer."

However, with particular attention to the presently disclosed invention, FIG. 4 also shows that the empirical data does not support other predictions of the SAE Conference Paper. For example, the thickness of outer transparency sheet does not necessarily "dominate the impact resistance of the windshield" as the SAE Conference Paper predicted. Specifically, the family of glazings in which the thickness 42 of outer transparency sheet 36 is a constant 2.1 mm, the stone impact resistance is actually lower when thickness 56 of inner transparency sheet 50 is between 1.3 mm and 1.5 mm than for either the 1.6 mm or 1.8 mm glazing families. This is the reverse of what would be expected from the SAE Conference Paper and shows that the teachings of the prior art, including the ratios described in the '919 Patent do not apply when thickness 42 of outer transparency sheet 36 is 2.1 mm (which is greater than the thicknesses of the '919 Patent test population).

FIG. 4 also shows that when thickness 56 of inner transparency sheet 50 is 1.2 mm and thickness 42 of outer transparency sheet is 2.1 mm, stone impact resistance of the glazing is greater than all other asymmetric glazings in which thickness 42 of outer transparency sheet 36 is. 1.8 mm or 1.6 mm and thickness of inner transparency sheet 50 to 1.2 mm or greater. This means that an asymmetric glazing wherein outer transparency sheet 36 is 2.1 mm and inner transparency sheet 50 is 1.2 mm provides greater stone impact resistance and, in many cases, affords significantly lower weight than asymmetric glazings with a thinner outer transparency sheet.

FIG. 4 further shows that stone impact resistance of 2.1/1.2 mm asymmetric glazings remains greater than the 1.6 mm and 1.8 mm families even in many cases when the thickness 56 of inner transparency sheet 50 is less than 1.2 mm. However, the rate of gain in stone impact resistance decreases as the thickness of inner transparency sheet 50 decrease from 1.2 mm. When performance parameters other than stone impact resistance are taken into consideration, the 2.1/1.2 asymmetric glazing is found to be the most preferred asymmetric glazing. For example, FIG. 4 shows steady increase in stone impact resistance for thinner inner transparency sheets down to thicknesses of 0.7 mm. However, compared to 1.4 mm glass, 0.7 mm glass requires a more expensive raw material and involves more process steps than 1.4 mm glass. Specifically, 1.4 mm glass can be strengthened by thermal tempering whereas 0.7 mm glass generally uses aluminosilicate glass (as opposed to soda-lime silicate glass) that is strengthened through an ion-exchange process.

In an example of a preferred embodiment, the outer transparency sheet 36 and inner transparency sheet 50 may be composed of silicate glass or soda lime glass although other types of transparency materials can also be used.

The disclosed invention may also include additional features such as reflective coatings on surface 40 of outer transparency sheet 36 or on surface 52 of inner transparency sheet for reflecting solar radiation in the infrared spectrum.

Those and other details that will be apparent to those skilled in the art are included in scope of the following claims.

We claim:

1. An asymmetric glazing laminate comprising:
   an outer transparency that defines a sheet with a first surface and a second surface that is oppositely disposed on said sheet from said first surface, said first surface of said outer transparency being separated from said second surface of said outer transparency by a thickness dimension in the range of 2.05 mm to 2.14 mm;
   an interlayer that defines a layer of polymer material having a first surface and a second surface that is oppositely disposed on said layer of polymer from said first surface, the first surface of said layer of polymer material being opposed to the second surface of said outer transparency sheet; and
   an inner transparency that is strengthened by thermal tempering, said inner transparency defining a sheet with a first surface and a second surface that is oppositely disposed on said sheet of said inner transparency from said first surface, said first surface of said inner transparency being separated from said second surface of said inner transparency by a thickness dimension in the range of 1.15 mm to 1.25 mm, the second surface of said layer of polymer material being opposed to the first surface of said sheet of said inner transparency.

2. The asymmetric glazing of claim 1 wherein the nominal thickness dimension of said outer transparency is 2.1 mm and wherein the nominal thickness dimension of said inner transparency is 1.2 mm.

3. The asymmetric glazing of claim 1 wherein the stress levels of said outer transparency upon failure from impact are higher than the stress levels in an outer transparency of a symmetrical glazing wherein said symmetrical glazing includes an outer transparency and an inner transparency having the same nominal thickness as the thickness of the outer transparency of said asymmetric glazing.

4. The asymmetric glazing of claim 1 wherein said interlayer polymer is selected from the group comprising ethylene vinyl acetate, polyvinyl butyral, polyethane, polycarbonate, polyethylene terephthalates, and combinations thereof.

5. The asymmetric glazing of claim 3 wherein the outer transparency of said symmetrical glazing defines a sheet with a first surface and a second surface that is oppositely disposed on said sheet from said first surface of said outer transparency, and wherein the weight of said asymmetric glazing per unit area of the first surface of said outer transparency of said asymmetric glazing is at least 20% lower than the weight per the same unit area of the first surface of said outer transparency of said symmetrical glazing.

6. The asymmetric glazing of claim 1 wherein said first surface of said interlayer is separated from the second surface of said interlayer by a thickness dimension in the range of 0.71 mm to 0.81 mm.

7. The asymmetric glazing of claim 4 wherein said interlayer polymer is polyvinyl butyral.

8. The asymmetric glazing of claim 1 wherein said outer transparency and said inner transparency is selected from the group of materials comprising silicate glass, soda-lime glass, and combinations thereof.

9. The asymmetric glazing of claim 7 wherein said outer transparency and said inner transparency are silicate glass.

* * * * *